(12) United States Patent
Kamitani

(10) Patent No.: US 7,837,956 B2
(45) Date of Patent: Nov. 23, 2010

(54) GAS GENERATION APPARATUS

(75) Inventor: Toshimi Kamitani, Fujioka (JP)

(73) Assignee: Mitsubishi Pencil Company, Limited, Shinagawa-Ku, Tokyo (JP)

( * ) Notice: Subject to any disclaimer, the term of this patent is extended or adjusted under 35 U.S.C. 154(b) by 0 days.

(21) Appl. No.: 12/663,447
(22) PCT Filed: Jul. 3, 2008
(86) PCT No.: PCT/JP2008/062079
§ 371 (c)(1),
(2), (4) Date: Dec. 7, 2009
(87) PCT Pub. No.: WO2009/008330
PCT Pub. Date: Jan. 15, 2009

(65) Prior Publication Data
US 2010/0172805 A1    Jul. 8, 2010

(30) Foreign Application Priority Data
Jul. 6, 2007    (JP) .............................. 2007-178146

(51) Int. Cl.
*B01J 35/02* (2006.01)
*G05D 16/00* (2006.01)
*B01J 7/00* (2006.01)
*H01M 8/06* (2006.01)

(52) U.S. Cl. ...................... 422/211; 422/220; 422/112; 48/61

(58) Field of Classification Search ................. 422/211, 422/220, 112; 48/61
See application file for complete search history.

(56) References Cited
U.S. PATENT DOCUMENTS
5,102,627 A    4/1992    Plester
(Continued)

FOREIGN PATENT DOCUMENTS
EP    1770809 A1 *    4/2007
(Continued)

OTHER PUBLICATIONS

Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2008/062079, Feb. 4, 2010, The International Bureau of WIPO, Geneva, CH.
International Search Report for PCT/JP2008/062079, mailed Aug. 19, 2008.

*Primary Examiner*—Walter D Griffin
*Assistant Examiner*—Natasha Young
(74) *Attorney, Agent, or Firm*—Buchanan Ingersoll & Rooney PC

(57) ABSTRACT

In order to provide a gas generation apparatus such as a hydrogen gas generation apparatus for a fuel cell or an oxygen gas generation apparatus used in medical sites and at the time of disasters in which a solid gas generating agent such as metal is brought into contact with a reaction liquid to generate hydrogen gas or oxygen gas, a gas generation apparatus A having a solid gas generating agent and a reaction liquid in which the solid gas generating agent and the reaction liquid are stored respectively in separate storing vessels 21, 31 and in which the reaction liquid is supplied into the gas generating agent-storing vessel to generate gas by capillary-active connection of the respective storing vessels assumes a constitution in which capillary-active connection is shut off when a pressure of the gas is raised. In the above gas generation apparatus, generation of the gas can automatically be controlled by a simple mechanism when the gas is not consumed, and therefore generation of excessive gas can be controlled.

8 Claims, 6 Drawing Sheets

U.S. PATENT DOCUMENTS

| | | | |
|---|---|---|---|
| 5,833,934 A * | 11/1998 | Adlhart | 422/239 |
| 2005/0036941 A1* | 2/2005 | Bae et al. | 423/658.2 |
| 2005/0158595 A1 | 7/2005 | Marsh et al. | |
| 2007/0221190 A1 | 9/2007 | Mitsui et al. | |

FOREIGN PATENT DOCUMENTS

| | | |
|---|---|---|
| JP | 51-018971 A | 2/1976 |
| JP | 51-023990 A | 2/1976 |
| JP | 1-133917 A | 5/1989 |
| JP | 2004-149394 A | 5/2004 |
| JP | 2004-168569 A | 6/2004 |
| JP | 2006-263549 A | 10/2006 |
| JP | 2006-327871 A | 12/2006 |
| JP | 2007-111670 A | 5/2007 |
| JP | 2007-518547 A | 7/2007 |

* cited by examiner

GAS GENERATION APPARATUS

TECHNICAL FIELD

The present invention relates to a gas generation apparatus in which a solid gas generating agent such as metal is brought into contact with a reaction liquid to generate hydrogen gas or oxygen gas, particularly to a gas generation apparatus useful as technology for supplying hydrogen gas to a fuel cell or a gas generation apparatus useful as an oxygen gas generation apparatus which is used for mental health care and in medical sites and at the time of disasters.

BACKGROUND ART

In recent years, a polymer electrolyte fuel cell (PECF) in which hydrogen gas is derived from metal and an aqueous solution and used as fuel is being actively developed as a fuel cell for portable devices.

In general, a fuel cell of a type in which hydrogen is used as fuel is characterized in that it has a high output as compared with that of a direct methanol fuel cell (DMCF), and in addition thereto, it is characterized in that a power generation part itself can assume a simple structure.

Conventionally known as a hydrogen gas generation apparatus for a fuel cell are, for example, a hydrogen generation apparatus comprising a tank for storing water, a reaction vessel for storing metal which is chemically reacted with water to generate hydrogen, a receiving part for receiving the reaction vessel, a heating means which is disposed in contact with the receiving part and which is used for heating the reaction vessel, an introduction pipe for supplying water from the tank described above to the reaction vessel received in the receiving part, a return pipe for introducing hydrogen generated in the reaction vessel and unreacted water into the tank and a discharge pipe for discharging hydrogen and water in the tank, which is extended from the tank, wherein the reaction vessel described above is detachable to the receiving part (refer to, for example, patent document 1) and a hydrogen gas generation apparatus in which a solid hydrogen generating agent is reacted with a reaction liquid to generate hydrogen, wherein it is equipped with a first storing part in which the hydrogen generating agent divided into plural portions is stored, a second storing part in which the reaction liquid divided into plural potions is stored and a partition means which comprises partition members for partitioning the respective divisions in the first storing part and the respective divisions in the second storing part and in which the partition members are opened in order to make it possible to bring the matters stored in the respective divisions of the first storing part into contact with the matters stored in the respective divisions of the second storing part (refer to, for example, patent document 2).

However, the hydrogen generation apparatus described in patent document 1 has the problem that it is difficult to stop generating hydrogen gas once generation of hydrogen gas starts and that it is difficult as well to stop generating hydrogen gas, for example, even after stopping the operation of the apparatus. In a case where an aqueous solution is supplied by a pump and the like, a generation amount of hydrogen can be controlled by controlling a total amount of the liquid supplied from the pump. In this case, however, the apparatus is large-scaled and complicated, and therefore it is unsuited for a small-sized hydrogen generation apparatus and a fuel generation apparatus of fuel cells for portable devices.

Further, in the hydrogen gas generation apparatus described in patent document 2, the hydrogen generating agent stored in the respective divisions are brought into contact with the reaction liquid with opening the portioning means in order thereby to generate hydrogen. However, involved therein is the problem that continuous supply of hydrogen gas is stopped temporarily or hydrogen gas is not sufficiently supplied in a certain case, and further involved therein is the problem that since the reaction can not be controlled following generation of hydrogen, hydrogen gas can not be supplied according to the requirement from the devices.

On the other hand, known as an oxygen gas generation apparatus is, for example, a portable oxygen generation apparatus comprising a first vessel which stores a reaction liquid in the inside and is equipped with an openable sealing part for discharging the reaction liquid, a second vessel which receives the first vessel in the inside and which is equipped with a controlling hole for controlling a discharge rate of the reaction liquid and a third vessel which receives at least the second vessel and stores an oxygen generating agent in the inside, wherein a discharge port for supplying oxygen to the outside is disposed in the vessel in the outermost shell of the portable oxygen generation apparatus (refer to, for example, patent document 3).

However, though the oxygen generation apparatus described in patent document 3 can control a generating rate of oxygen, involved therein is the problem that it is difficult to stop generating oxygen gas once it starts as is the case with the hydrogen generation apparatus described in patent document 1.

Patent document 1: Japanese Patent Application Laid-Open No. 2004-149394 (claims, examples and others)

Patent document 2: Japanese Patent Application Laid-Open No. 2006-327871 (claims, examples and others)

Patent document 3: Japanese Patent Application Laid-Open No. 2004-168569 (claims, examples and others)

DISCLOSURE OF THE INVENTION

Problems to be Solved by the Invention

In light of the conventional problems described above, the present invention has been made in order to solve them, and an object thereof is to provide a gas generation apparatus which can control generation of an excessive amount of hydrogen gas or oxygen gas by terminating generation of hydrogen gas or oxygen gas by a simple mechanism.

Means for Solving the Problems

Intensive studies on the conventional problems described above repeated by the present inventors have resulted in succeeding in obtaining the aimed gas generation apparatus which contains a solid gas generating agent and a reaction liquid and in which the solid gas generating agent and the reaction liquid are stored respectively in separate storing vessels and in which the reaction liquid is supplied into a gas generating agent-storing vessel by connecting the respective storing vessels by a specific means to generate gas, wherein the connection described above is shut off by a specific mechanism when a pressure of the gas is raised, and thus the present invention has come to be completed.

That is, the present invention comprising the following items (1) to (10).

(1) A gas generation apparatus comprising a solid gas generating agent and a reaction liquid in which the solid gas generating agent and the reaction liquid are stored respectively in separate storing vessels and in which the reaction liquid is supplied into the gas generating agent-storing vessel with capillary-active connection of the respective storing vessels to generate gas, wherein capillary-active connection is shut off when a pressure of the gas is raised.

(2) The gas generation apparatus as described in the above item (1), wherein the gas generated is hydrogen gas or oxygen gas.

(3) The gas generation apparatus as described in the above item (1) or (2), wherein the gas generating agent-storing vessel and the reaction liquid-storing vessel are provided with porous bodies having capillary force; and the respective porous bodies are brought into contact to connect the capillary tubes so that the reaction liquid is supplied.

(4) The gas generation apparatus as described in any of the above items (1) to (3), wherein the reaction liquid-storing vessel or the gas generating agent-storing vessel is slid when a pressure of the gas is raised, whereby the porous bodies fall in a non-contact state, and capillary-active connection is shut off.

(5) The gas generation apparatus as described in any of the above items (1) to (4), wherein the reaction liquid-storing vessel is connected with the gas generating agent-storing vessel by virtue of resilient force of an elastic member.

(6) The gas generation apparatus as described in any of the above items (1) to (5), wherein the reaction liquid-storing vessel is separated from the gas generating agent-storing vessel by resilient force of the elastic member, and both vessels are connected by negative pressure brought about by consumption of the gas.

(7) The gas generation apparatus as described in any of the above items (3) to (6), wherein the porous body is constituted of any one of a fiber bundle, a felt, a nonwoven fabric, a sintered body, a foamed body and a slit body.

(8) The gas generation apparatus as described in any of the above items (1) to (7), wherein the reaction liquid is occluded in a reaction liquid-occluding body having capillary force which comprises any one of a fiber bundle, a felt, a nonwoven fabric, a sintered body, a foamed body and a slit body.

(9) The gas generation apparatus as described in any of the above items (1) to (8), wherein the solid gas generating agent is constituted of metal selected from the following group A or a catalyst selected from the following group B:

group A: iron, magnesium, aluminum, zinc, tin and sodium boron hydride, group B: manganese dioxide and platinum.

(10) The gas generation apparatus as described in any of the above items (1) to (9), wherein the reaction liquid comprises at least one of water, acids, alkalis, alcohols and hydrogen peroxide aqueous solutions.

EFFECTS OF THE INVENTION

According to the present invention, provided is a gas generation apparatus in which generation of gas can automatically be controlled by a simple mechanism when the gas is not consumed, so that excess gas can be inhibited from being generated.

EXPLANATION OF REFERENCE NUMERALS AND LETTERS

Figure 1:
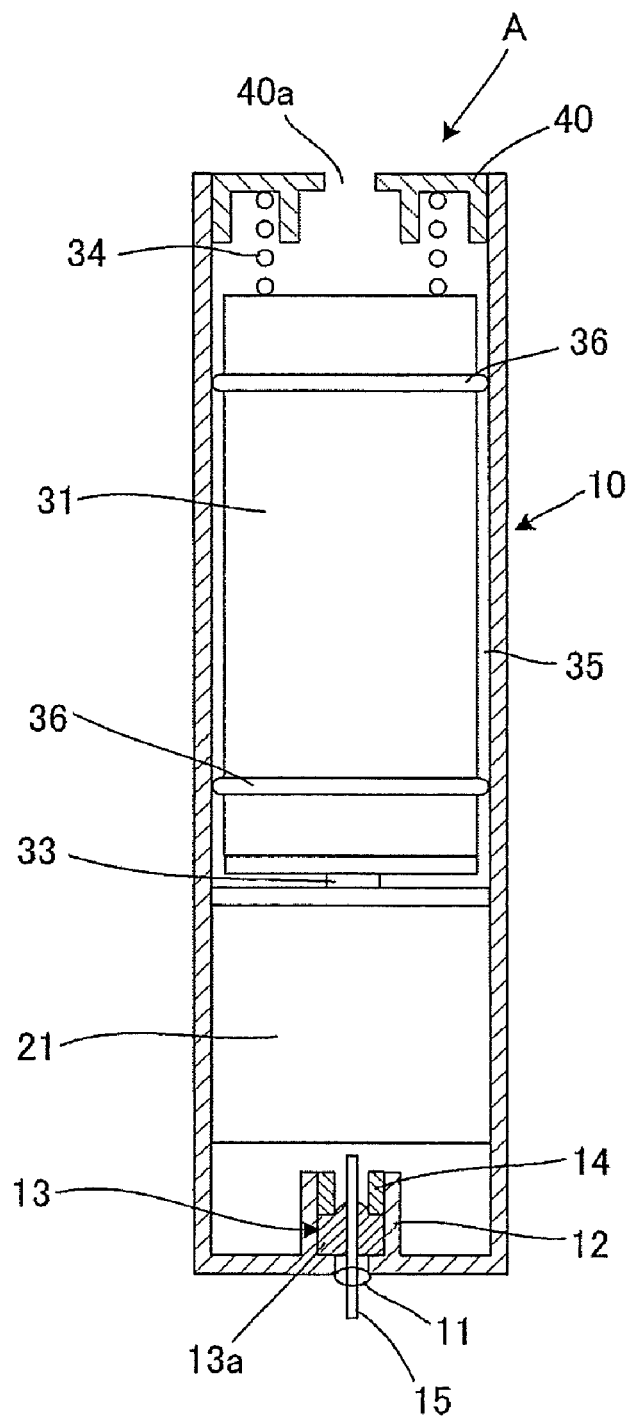
FIG. 1 is an outline cross-sectional drawing of a gas generation apparatus showing one example of the embodiments of the present invention.

A Gas generation apparatus
10 Apparatus main body
20 Gas generating agent
21 Gas generating agent-storing vessel
30 Reaction liquid-occluding body
31 Reaction liquid-storing vessel

BEST MODE FOR CARRYING OUT THE INVENTION

The embodiments of the present invention shall be explained below in details with reference to the drawings.

Figure 2:
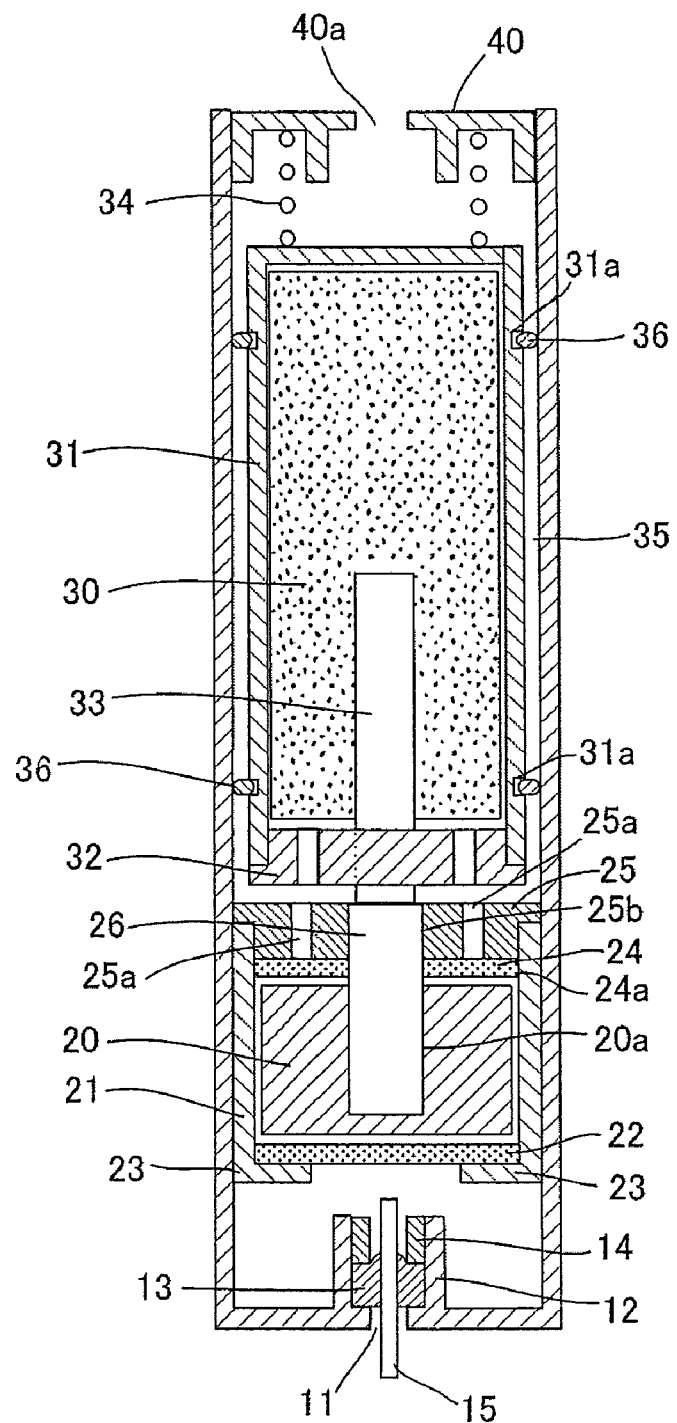
FIG. 2 is a vertical cross-sectional drawing of the gas generation apparatus.
Figure 3:
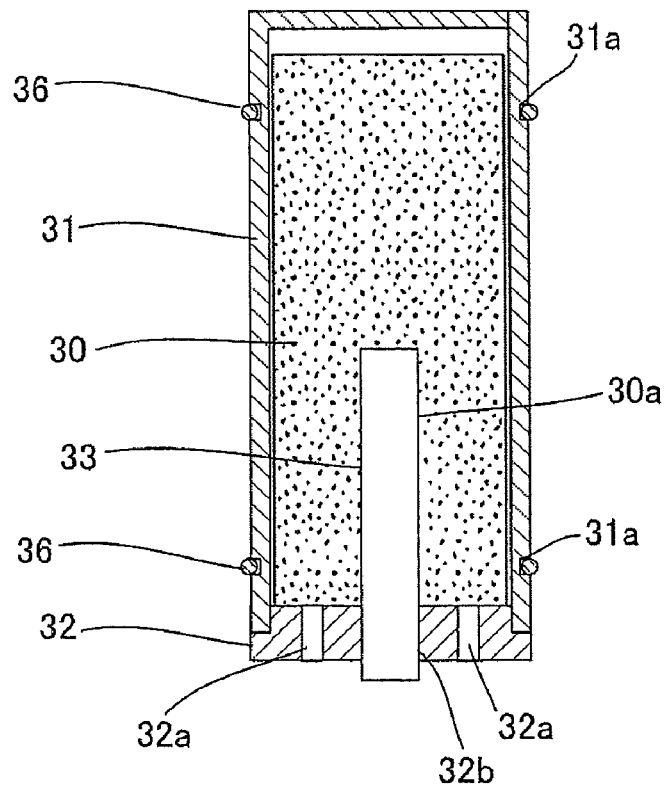
FIG. 3 is a vertical cross-sectional drawing for explaining a reaction liquid-storing vessel and a gas generating agent-storing vessel in the gas generation apparatus in detail.
Figure 3:
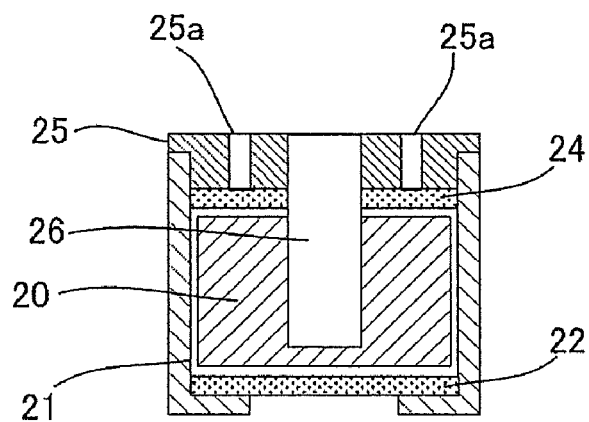
Figure 4:
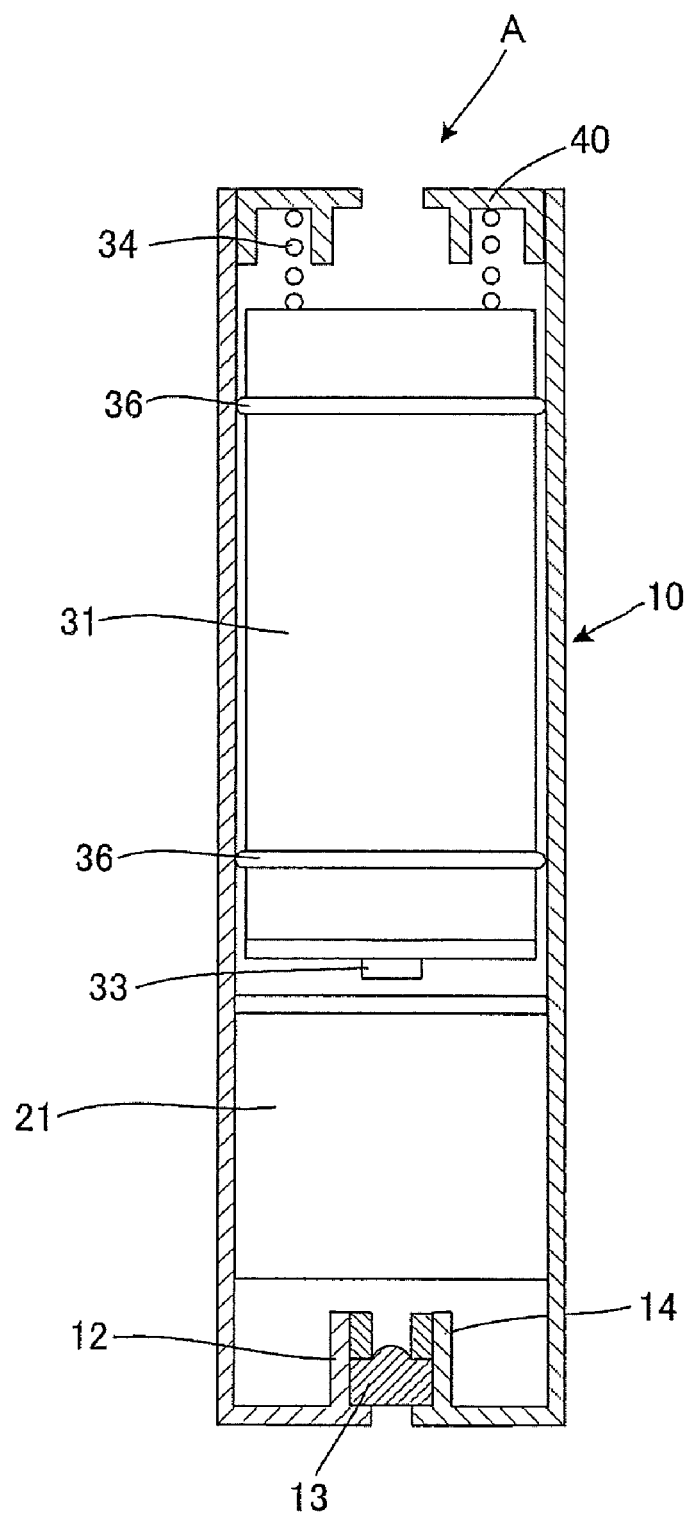
FIG. 4 is a vertical cross-sectional drawing for explaining a state in which an inner pressure is raised in the gas generation apparatus to allow a reaction liquid-storing vessel to be slid and in which capillary-active connection is shut off.

FIG. 1 to FIG. 4 show a gas generation apparatus which is one example of the embodiments of the present invention; FIG. 1 is an outline cross-sectional drawing of the gas generation apparatus; FIG. 2 is a vertical cross-sectional drawing of the gas generation apparatus; FIG. 3 is a vertical cross-sectional drawing for explaining a reaction liquid-storing vessel and a gas generating agent-storing vessel in the gas generation apparatus in detail; and FIG. 4 is a vertical cross-sectional drawing for explaining a state in which an inner pressure is raised in the gas generation apparatus to allow a reaction liquid-storing vessel to be slid and in which capillary-active connection is shut off.

The gas generation apparatus A of the embodiment of the present invention is equipped with a bottomed cylindrical apparatus main body 10 and assumes a constitution in which a storing vessel 21 storing a solid gas generating agent 20 is firmly fixed by engagement and the like at a lower side of the apparatus main body 10 and in which a reaction liquid-storing vessel 31 storing a reaction liquid-occluding body 30 occluding a reaction liquid is slidably received at an upper side.

The apparatus main body 10 is constituted of a gas impermeable synthetic resin or the like having durability, wherein a discharge hole 11 which is a gas discharge port is formed at a bottom part, and a cylindrical part 12 which is communicated with the discharge hole 11 is formed. A sealing valve 13 is disposed in the cylindrical part 12 by means of a stopper member 14.

A slit hole 13a is formed at a central part of the sealing valve 13, and a metal-made or synthetic resin-made gas supplying tube 15 can be installed therein. This sealing valve 13 assumes a state in which it is compressed in a diameter direction when it is mounted in the cylindrical part 12 described above, whereby the slit hole 13a is tightly sealed to prevent gas generated in the apparatus 10 from being discharged to the outside of the apparatus. The above sealing valve 13 is constituted preferably of a material having low gas permeability, and the material includes, for example, rubbers such as butyl rubber, silicone rubber and thermoplastic elastomers. It can be produced by ordinary injection molding, vulcanization molding and the like.

The gas generating agent-storing vessel 21 is constituted of a synthetic resin or the like which is not reactive to the gas generating agent stored therein, and it is approximately a cylinder and has a holding part 23 for holding a tabular lower filter member 22 at a bottom part. The tabular lower filter member 22 is held at the bottom part in the gas generating agent-storing vessel 21. The solid gas generating agent 20 and an upper filter member 24 are installed on the lower filter member 22, and a resin-made lid member 25 having air ventilation holes 25a, 25a is firmly fixed by engagement in an opening part of the storing vessel 21. A concave part 20a is formed in the solid gas generating agent 20 described above, and through holes 24a, 25b are formed in the upper filter member 24 and the lid member 25. A lower porous body 26 is inserted into the through holes 24a, 25b and mounted up to a bottom part of the concave part 20a.

The lower filter member 22 and the upper filter member 24 each described above are members through which gas generated by reacting the solid gas generating agent 20 with the reaction liquid 30 is permeated, and they are constituted of, for example, a gas permeable resin plate made of a fluororesin having an average pore diameter of 1 to 100 μm.

The reaction liquid-storing vessel 31 is constituted of a synthetic resin or the like which is not reactive to the reaction liquid. It is a vessel having an open part 31a in a lower part, and the reaction liquid-occluding body 30 having capillary force which occludes the reaction liquid is received in the storing vessel 31. The above reaction liquid-occluding body 30 is constituted of a material having capillary force which is selected from a fiber bundle, a felt, a nonwoven fabric, a sintered body, a foamed body and a slit body.

Also, a resin-made lid member 32 having air ventilation holes 32a, 32a is firmly fixed by engagement and the like in the opening part 31a of the reaction liquid-storing vessel 31. A concave part 30a is formed in the reaction liquid-occluding body 30 described above, and a through hole 32b is formed in the lid member 32. An upper porous body 33 is inserted into the through holes 32b and mounted up to a bottom part (the upper part in the drawing) of the concave part 30a.

The upper porous body 33 and the lower porous body 26 each described above are constituted of a material having capillary force which is selected from a fiber bundle, a felt, a nonwoven fabric, a sintered body, a foamed body and a slit body, and assumed is a constitution in which the upper porous body 33 is capillary-actively connected with the lower porous body 26 thereby to supply the reaction liquid occluded in the reaction liquid-occluding body 30 to the solid gas generating agent 20 via the upper porous body 33 and the lower porous body 26. The capillary force (a porosity and the like) of the upper porous body 33 and the lower porous body 26 is preferably controlled so that the reaction liquid occluded in the reaction liquid-occluding body 30 can efficiently be supplied to the lower porous body 26 via the upper porous body 33.

The reaction liquid-storing vessel 31 in which the reaction liquid-occluding body 30 are received assumes a constitution in which it is slidably disposed at the upper side in the apparatus main body 10 and in which it is always forced toward the lower side by virtue of resilient force of an elastic member 34 such as a coil spring and the like to be connected with the gas generating agent-storing vessel 21. That is, the upper end side of the elastic member 34 is mounted in a lid main body 40 having an opening part 40a which is firmly fixed to the upper opening part of the apparatus main body 10 by engagement and the like, and the lower end side thereof is mounted to the upper face of the reaction liquid-storing vessel 31, wherein force is always exerted to the reaction liquid-storing vessel 31 toward the lower side by virtue of resilient force of the elastic member 34 to allow the reaction liquid-storing vessel 31 to be connected with the gas generating agent-storing vessel 21. This makes it possible to secure satisfactory capillary-active connection.

Further, a sealing member 36 made of a silicone rubber and the like is installed to a concave part 31b of a circumferential face of the reaction liquid-storing vessel 31 so that gas generated does not leak from a gap 35 between the apparatus main body 10 and the reaction liquid-storing vessel 31.

Various combinations of the solid gas generating agent 20 and the reaction liquid occluded in the occluding body 30 which are used in the present invention can be given according to the kind of gas generated. In the case of, for example, hydrogen gas and oxygen gas, the solid gas generating agent 20 includes metal selected from the following group A or a catalyst selected from the following group B, and the reaction liquid includes at least one of water (refined water, ion-exchanged water and the like), acids (hydrochloric acid, sulfuric acid and the like), alkalis (a sodium hydroxide aqueous solution, a magnesium hydroxide aqueous solution and the like), alcohols (a methanol aqueous solution, an ethanol aqueous solution and the like) and hydrogen peroxide solutions:

group A: iron, magnesium, aluminum, zinc, tin and sodium boron hydride, group B: manganese dioxide and platinum.

The metals described above can be constituted in the forms of, for example, particles, powder, tablets and the like so that they can be reacted with the reaction liquid to efficiently generate gas. In respect to a storing amount of the solid gas generating agent 20 and an amount of the reaction liquid occluded in the occluding body 30, the optimum amounts thereof are preferably stored considering the kind of the solid gas generating agent, the kind of the reaction liquid and the kind of the gas generated by reaction.

The specific combinations thereof in the case of hydrogen gas include, for example, 1) the solid gas generating agent: iron (reduced iron) and the reaction liquid: hydrochloric acid, 2) the solid gas generating agent: magnesium and the reaction liquid: sulfuric acid, 3) the solid gas generating agent: aluminum and the reaction liquid: water, 4) the solid gas generating agent: sodium boron hydride and the reaction liquid: sulfuric acid, and the like.

In the case of oxygen gas, given are a combination of the solid gas generating agent: manganese oxide (catalyst) and the reaction liquid: hydrogen peroxide, and the like.

In the gas generation apparatus A of the present embodiment thus constituted, the solid gas generating agent 20 (for example, reduced iron) and the reaction liquid (for example, hydrochloric acid) are stored, as shown in FIG. 1 to FIG. 3, in the separate storing vessels 21, 31 respectively, and the lower porous body 26 and the upper porous body 33 each having capillary force which are inserted into the respective storing vessels 21, 31 are capillary-actively connected by resilient force of the elastic member 34, whereby the reaction liquid is supplied to the gas generating agent-storing vessel 21 to generate hydrogen gas. The hydrogen gas generated can be discharged to the outside of the apparatus main body 10 passing through the gas supplying tube 15 inserted into the sealing valve 13 without leaking to the upper side attributable to a sealing member 36. If the apparatus main body 10 is connected to a fuel cell main body via a hydrogen gas supplying tube, it is useful as a hydrogen gas generation apparatus for a fuel cell.

In the gas generation apparatus A of the present embodiment, when hydrogen is not used though being in a state in which hydrogen is produced with the capillary-active connection, for example, when the gas supplying tube 15 is detached from the sealing valve, hydrogen is prevented from flowing out to the outside of the apparatus main body 10 by the sealing valve 13 so that hydrogen gas is filled in the apparatus 10; To be specific, the hydrogen gas passes through the upper filter member 24 and is filled into an upper part side; when an inner pressure of the hydrogen gas grows further higher, the pressure thereof is exerted on the reaction liquid-storing vessel 31, and when it grows larger than resilient force of the elastic member 34 described above, the vessel 21 slid to the upper side as shown in FIG. 4; and capillary-active connection of the lower porous body 26 with the upper porous body 33 is shut off (brought into no contact), whereby the reaction liquid stops being supplied, and generation of hydrogen gas is terminated.

Accordingly, in the gas generation apparatus A of the present embodiment, generation of gas such as hydrogen gas can automatically be terminated by a simple mechanism without electrically and artificially controlling when gas such as hydrogen gas is not consumed, so that excessive gas can be inhibited from being generated.

Figure 5:
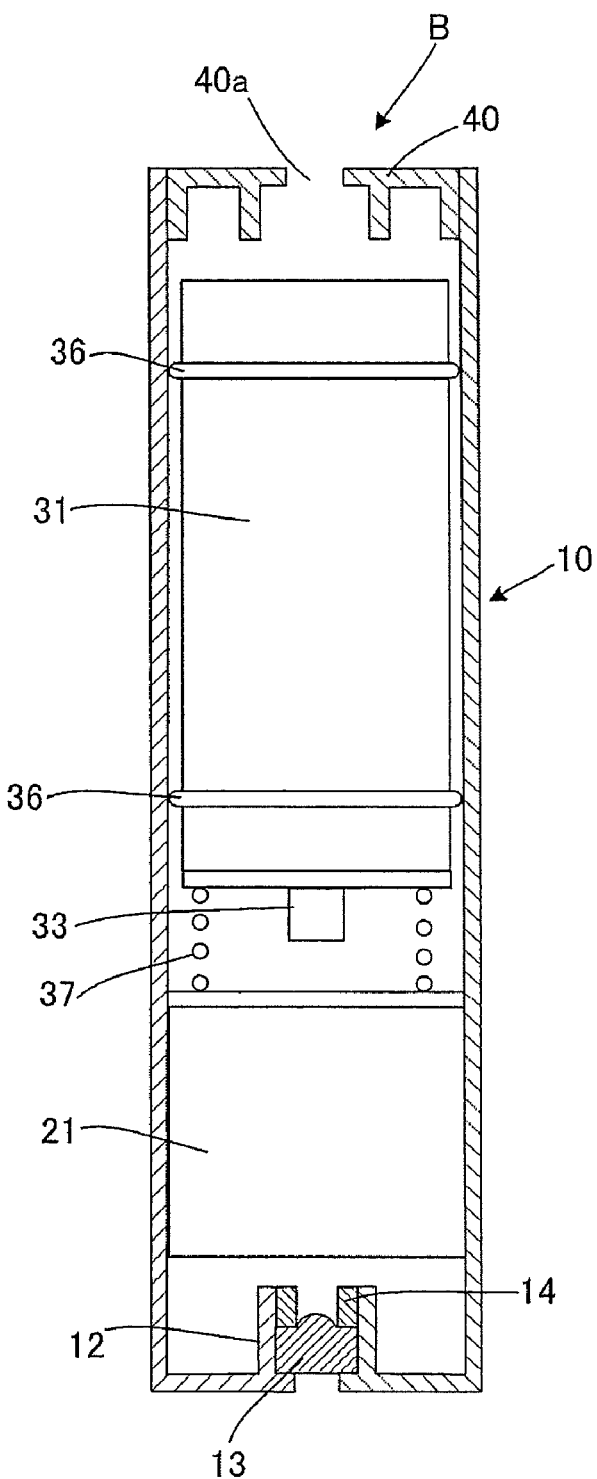
FIG. 5 is an outline cross-sectional drawing of a gas generation apparatus showing another example of the embodiments of the present invention.
Figure 6:
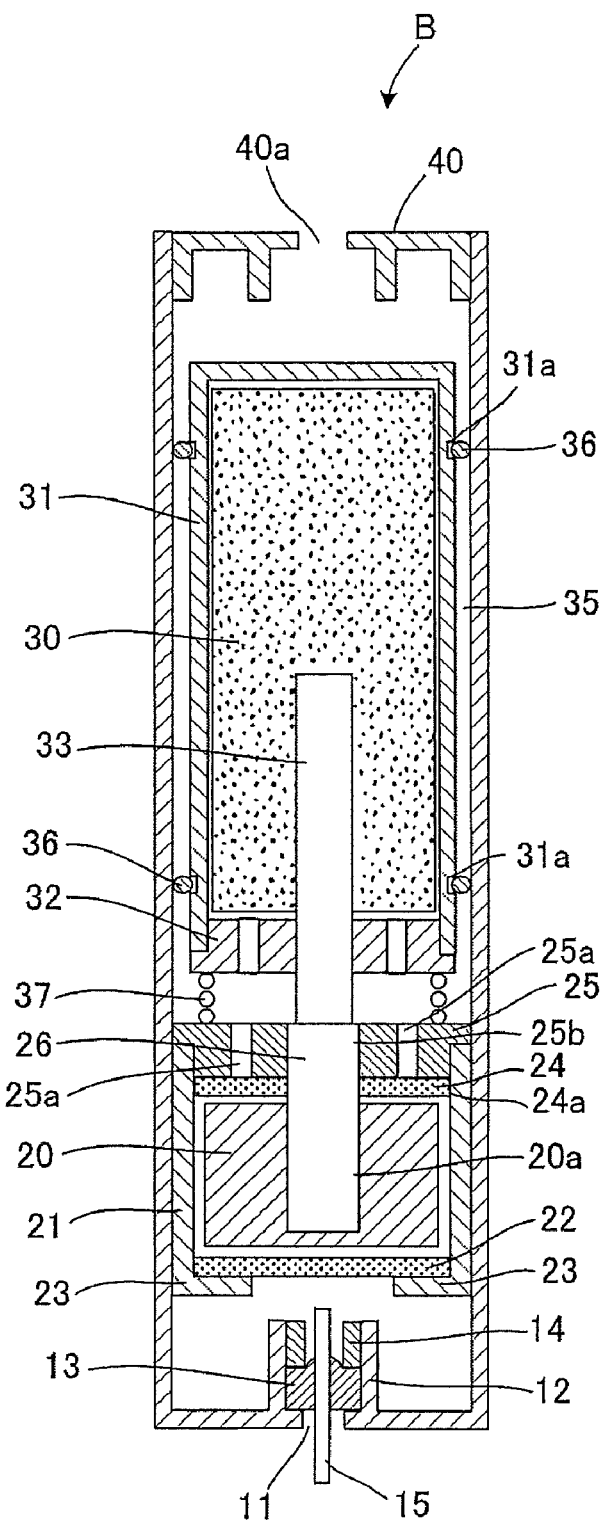
FIG. 6 is a vertical cross-sectional drawing for explaining a state in which an inner pressure is raised in the gas generation apparatus shown in FIG. 5 to allow a reaction liquid-storing vessel to be slid and in which capillary-active connection is shut off.

A gas generation apparatus showing the other embodiment of the present invention is shown in FIG. 5 and FIG. 6, wherein FIG. 5 is a vertical cross-sectional drawing of the gas generation apparatus, and FIG. 6 is a vertical cross-sectional drawing for explaining a state in which an inner pressure is lowered in the gas generation apparatus to allow a reaction liquid-storing vessel 31 to be slid to be capillary-actively connected. Explanation of the same constitution as that of the gas generation apparatus A of the embodiment described above shall be omitted by showing the same reference number.

The gas generation apparatus B of the present embodiment is a gas generation apparatus characterized in that capillary-active connection of the reaction liquid-storing vessel 31 with the gas generating agent-storing vessel 21 is not shut off by pressure of gas generated, that the reaction liquid-storing vessel 31 is disconnected from the gas generating agent-storing vessel 21 by resilient force of the elastic member 37 and that the reaction liquid-storing vessel 31 moves downward by negative pressure brought about by consumption of the gas and is capillary-actively connected with the gas generating agent-storing vessel 21.

In the gas generation apparatus B of the present embodiment thus constituted, the solid gas generating agent 20 (for example, reduced iron) and the reaction liquid (for example, hydrochloric acid) are stored in the separate gas generating agent-storing vessel 21 and reaction liquid-storing vessel 31 respectively, and the elastic member 37 is inserted between them. Usually, connection thereof is shut off as shown in FIG. 5, and the reaction liquid-storing vessel 31 is slid (the elastic member 37 shrinks), as shown in FIG. 6, toward the gas generating agent-storing vessel 21 with reducing an inner pressure of the vessel in the beginning or during consumption of hydrogen gas and capillary-actively connected therewith, whereby the hydrogen gas generation reaction starts.

Hydrogen gas generated by the gas generation apparatus B of the present embodiment can be discharged without leaking to the outside of the apparatus main body 10 passing through the gas supplying tube 15 inserted into the sealing valve 13. If the apparatus main body 10 is connected to a fuel cell main body via a hydrogen gas supplying tube, it is useful as a hydrogen gas generation apparatus for a fuel cell. Accordingly, the gas generation apparatus B of the present embodiment thus constituted assumes a constitution in which the reaction liquid-storing vessel 31 is disconnected from the gas generating agent-storing vessel 21 by resilient force of the elastic member 37 and in which they are connected by negative pressure brought about by consumption of the gas, and therefore generation of gas such as hydrogen gas can automatically be terminated by a simple mechanism without electrically and artificially controlling when gas such as hydrogen gas is not consumed, so that excessive gas can be inhibited from being generated.

The gas generation apparatus of the present invention shall not be restricted to the respective embodiments described above and can be varied to various extents within the range of the technical concept of the present invention.

For example, in the embodiment described above, the generation apparatus of hydrogen gas has been explained, but using manganese oxide as the solid gas generating agent 20 and a hydrogen peroxide aqueous solution as the reaction liquid and storing them in the separate storing vessels 21, 31 respectively make it possible to generate oxygen gas and discharge the oxygen gas generated to the outside of the apparatus main body 10 without leaking passing through the gas supplying tube 15 inserted into the sealing valve 13. If the apparatus main body 10 is connected to an oxygen gas generation mechanism which is used for mental health care and in medical sites and at the time of disasters, it is useful as an oxygen gas generation apparatus for the above uses.

Assumed is a constitution in which in the gas generation apparatus A of the present embodiment described above, the reaction liquid-storing vessel 31 is firmly fixed by engagement and the like in the apparatus 10 without installing the elastic member 34 and the sealing member 36; a sealing member made of a silicone rubber and the like is installed to a circumferential face of the gas generating agent-storing vessel 21 to slidably receive the gas generating agent-storing vessel 21 at the lower side in the apparatus 10, and force is always exerted to it toward the upper side by virtue of resilient force of an elastic member such as a coil spring and the like to connect the gas generating agent-storing vessel 21 with the reaction liquid-storing vessel 31; and the lower porous body 26 and the upper porous body 33 are capillary-actively connected by virtue of the resilient force of the elastic member described above. Thus, the same action mechanism as that of the gas generation apparatus A described above may be employed.

EXAMPLES

Next, the present invention shall be explained in further details with reference to examples, but the present invention shall not be restricted to the examples described below.

Example 1

A gas generation apparatus was obtained by the following production process, and then a hydrogen generation amount thereof was evaluated.

Production of Apparatus Main Body:
    Outer dimension: φ16×15 mm
    Inner dimension: φ14×11 mm
    Material: made of a vinyl chloride resin Lid Main Body:
    Dimension: φ14×5 mm
    Material: made of a vinyl chloride resin Sealing Valve:
  Dimension: major diameter 5 mm×minor diameter 4 mm
  Material: made of butyl rubber Mounting Member:
  Dimension: φ4×2 mm
  Material: made of a vinyl chloride resin Gas Supplying Tube:
  Dimension: outer diameter: φ1×15 mm, inner diameter: φ0.7×15 mm
  Material: made of stainless Production of Gas Generating Agent-Storing Vessel: Conforming to FIG. 1 to FIG. 3

Gas Generating Agent-Storing Vessel:
  Outer dimension: φ16×15 mm
  Inner dimension: φ14×11 mm
  Material: made of a vinyl chloride resin Lower and Upper Filter Members: Porous Bodies (Pore Diameter: 100 μm) Made of a Fluororesin
  Dimension: φ14×1 mm 2 sheets Reaction Liquid-Supplying Porous Body: Fiber Bundle Made of PET, Porosity: 50%
  Dimension: φ4×12 mm Gas Generating Agent: Reduced Iron (Manufactured by Wako Pure Chemical Industries, Ltd.) 1 g Production of Reaction Liquid-Storing Vessel: Conforming to FIG. 1 to FIG. 3

Reaction Liquid-Storing Vessel:
  Outer dimension: φ14.5×34 mm
  Inner dimension: φ12.5×30 mm
  Material: made of a vinyl chloride resin Reaction Liquid-Occluding Body:
  Dimension: φ12×28 mm
  Material: fiber bundle made of PET, porosity: 70%

Reaction Liquid-Supplying Porous Body:
  Dimension: φ3×17.5 mm
  Material: fiber bundle made of PET, porosity: 60%

Sealing member: φ14×1 mm 2 pieces
  Material: made of butyl rubber

Elastic member: φ12×15 mm, 0.3 N/mm
  Material: made of stainless, mounted with compressing to 7 mm, pressing pressure in mounting: 2.1N Reaction Liquid: 6N Hydrochloric Acid Aqueous Solution (Manufactured by Wako Pure Chemical Industries, Ltd.) 2 g The gas generation apparatus (hydrogen gas generation apparatus) described above was used to generate hydrogen gas under an environment of 25° C., and 0.8 liter of hydrogen gas could be generated.

Further, the gas supplying tube 15 was detached to terminate taking out of the hydrogen gas, whereby the inner pressure of the hydrogen generation apparatus was raised, and when the pressure reached 20 kPa, the reaction liquid-storing vessel 31 slid. Capillary-active connection was shut off, and the hydrogen stopped being generated. An inner pressure of the hydrogen generation apparatus after stopping was 30 kPa.

It has been found from the above results that in the gas generation apparatus of the present invention, generation of hydrogen gas could automatically be terminated by a simple mechanism without electrically and artificially controlling when hydrogen gas was not consumed.

What is claimed is:

1. A gas generation apparatus assuming a constitution in which an apparatus main body is equipped with a gas generating agent-storing vessel storing a solid gas generating agent and a reaction liquid storing vessel storing a reaction liquid; and the gas generating agent-storing vessel and the reaction liquid-storing vessel are provided with porous bodies having capillary force; and both the porous bodies are brought into contact to make a capillary-active connection between the porous bodies stored in the vessels so that the reaction liquid is supplied into the gas generating agent-storing vessel to generate gas, wherein the gas generated is discharged to the outside of the apparatus main body via a sealing valve mounted in the apparatus main body, and wherein when a pressure of the gas generated is raised in the apparatus main body by closing the sealing valve, the reaction liquid-storing vessel or the gas generating agent-storing vessel in the apparatus main body is moved by the pressure, whereby the porous bodies in the vessels fall in a non-contact state to shut off the capillary-active connection.

2. The gas generation apparatus as described in claim 1, wherein the gas generated is hydrogen gas or oxygen gas.

3. The gas generation apparatus as described in claim 1, wherein the porous bodies in the reaction liquid-storing vessel and the gas generating agent-storing vessel are connected with capillary-active connection by virtue of resilient force of an elastic member mounted in the apparatus main body.

4. The gas generation apparatus as described in claim 1, wherein the capillary-active connection between the porous bodies in the reaction liquid-storing vessel and the gas generating agent-storing vessel is shut off by resilient force of the elastic member mounted in the apparatus main body, and the porous bodies in the vessels are brought into contact each other to make capillary-active connection with the resilient force of the elastic member reduced by virtue of negative pressure brought about in the apparatus main body by consumption of the gas.

5. The gas generation apparatus as described in claim 1, wherein the porous body is constituted of any one of a fiber bundle, a felt, a nonwoven fabric, a sintered body, a foamed body and a slit body.

6. The gas generation apparatus as described in claim 1, wherein the reaction liquid is occluded in a reaction liquid-occluding body having capillary force which comprises any one of a fiber bundle, a felt, a nonwoven fabric, a sintered body, a foamed body and a slit body.

7. The gas generation apparatus as described in claim 1, wherein the solid gas generating agent is constituted of metal selected from the following group A or a catalyst selected from the following group B:
  group A: iron, magnesium, aluminum, zinc, tin and sodium boron hydride,
  group B: manganese dioxide and platinum.

8. The gas generation apparatus as described in claim 1, wherein the reaction liquid comprises at least one of water, acids, alkalis, alcohols and hydrogen peroxide aqueous solutions.

* * * * *